(12) United States Patent
Fuse et al.

(10) Patent No.: US 11,335,922 B2
(45) Date of Patent: May 17, 2022

(54) ENERGY CONVERSION SYSTEM

(71) Applicants: DENSO CORPORATION, Kariya (JP); TOYOTA JIDOSHA KABUSHIKI KAISHA, Toyota (JP)

(72) Inventors: Takuya Fuse, Kariya (JP); Kazutoshi Kuwayama, Kariya (JP); Hisao Nagashima, Kariya (JP); Kazutoshi Nishinakamura, Kariya (JP); Manabu Orihashi, Toyota (JP); Masakatsu Tsubouchi, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 16/717,381

(22) Filed: Dec. 17, 2019

(65) Prior Publication Data

US 2020/0127305 A1 Apr. 23, 2020

Related U.S. Application Data

(63) Continuation of application No. PCT/JP2018/022900, filed on Jun. 15, 2018.

(30) Foreign Application Priority Data

Jun. 26, 2017 (JP) .............................. JP2017-124570

(51) Int. Cl.
*F25B 17/08* (2006.01)
*F25B 30/04* (2006.01)
(Continued)

(52) U.S. Cl.
CPC ......... *H01M 8/04059* (2013.01); *F25B 17/08* (2013.01); *F25B 30/04* (2013.01);
(Continued)

(58) Field of Classification Search
CPC ......... H01M 8/04007; H01M 8/04014; H01M 8/04059; H01M 8/04119; H01M 8/04164; H01M 8/04171; H01M 8/04731; H01M 8/04738; H01M 8/04843; H01M 2250/20; B60K 8/00; B60L 58/33; B60L 50/72; B60Y 2306/05; B60Y 2400/202;
(Continued)

(56) References Cited

FOREIGN PATENT DOCUMENTS

JP H05347161 A 12/1993
JP 2001313054 A 11/2001
(Continued)

*Primary Examiner* — Brittany L Raymond
(74) *Attorney, Agent, or Firm* — Harness, Dickey & Pierce, P.L.C.

(57) ABSTRACT

An energy conversion system includes an energy converter, a cold generator, and a liquid water obtainer. The energy converter is configured to convert energy of a source from one form to another form and generate heat and water vapor. The cold generator is configured to generate cold using the heat generated by the energy converter. The liquid water obtainer is configured to condense the water vapor using the cold to obtain liquid water. Accordingly, the water vapor generated from the energy converter can be cooled efficiently. Therefore, efficiency in obtaining the liquid water can be improved compared with a case where the water vapor is cooled by open air.

6 Claims, 3 Drawing Sheets

(51) Int. Cl.
  *H01M 8/04* (2016.01)
  *H01M 8/04007* (2016.01)
  *H01M 8/04014* (2016.01)
  *H01M 8/04701* (2016.01)
  *H01M 8/04828* (2016.01)
  *B60L 50/72* (2019.01)

(52) U.S. Cl.
  CPC ... *H01M 8/04014* (2013.01); *H01M 8/04731* (2013.01); *H01M 8/04738* (2013.01); *H01M 8/04843* (2013.01); *B60L 50/72* (2019.02); *B60Y 2306/05* (2013.01); *B60Y 2400/202* (2013.01); *H01M 2250/20* (2013.01)

(58) Field of Classification Search
  CPC .......... F25B 17/08; F25B 27/02; F25B 30/04; Y02T 90/40; Y02E 60/50; Y02A 30/274
  See application file for complete search history.

(56) References Cited

FOREIGN PATENT DOCUMENTS

| | | | |
|---|---|---|---|
| JP | 2002-313383 | * | 10/2002 |
| JP | 2002313383 | A | 10/2002 |
| JP | 2004014444 | A | 1/2004 |
| JP | 200640713 | A | 2/2006 |

* cited by examiner

ENERGY CONVERSION SYSTEM

CROSS REFERENCE TO RELATED APPLICATION

The present application is a continuation application of International Patent Application No. PCT/JP2018/022900 filed on Jun. 15, 2018, which designated the U.S. and claims the benefit of priority from Japanese Patent Application No. 2017-124570 filed on Jun. 26, 2017. The entire disclosures of all of the above applications are incorporated herein by reference.

TECHNICAL FIELD

The present disclosure relates to an energy conversion system that generates water and heat during energy conversion.

BACKGROUND

Liquid water can be obtained from exhaust gas of a fuel cell and used for cooling a fuel cell system. The exhaust gas of the fuel cell can be cooled by a condenser to condense water vapor contained in the exhaust gas and store the condensed water.

SUMMARY

In view of a higher output of a fuel cell in the future, larger volume of water may be required to cool a fuel cell system. In contrast, since the exhaust gas from the fuel cell may have a higher temperature and a larger volume, cooling the exhaust gas from the fuel cell by open air may be insufficient, and it may be difficult to obtain liquid water from the exhaust gas. Accordingly, the volume of the liquid water for cooling the fuel cell system may become insufficient, and the user may be required to refill water.

An energy conversion system includes an energy converter, a cold generator, and a liquid water obtainer. The energy converter is configured to convert energy of a source from one form to another form and generate heat and water vapor. The cold generator is configured to generate cold using the heat generated by the energy converter. The liquid water obtainer is configured to condense the water vapor using the cold to obtain liquid water.

According to the present disclosure, the cold is generated at the cold generator using the heat from the energy converter, and the water vapor generated from the energy converter is condensed by the cold to obtain the liquid water. Accordingly, the water vapor discharged from the energy converter can be cooled efficiently, and efficiency in obtaining the liquid water can be improved compared with a case where the water vapor is cooled by open air.

EMBODIMENTS

Figure 1:
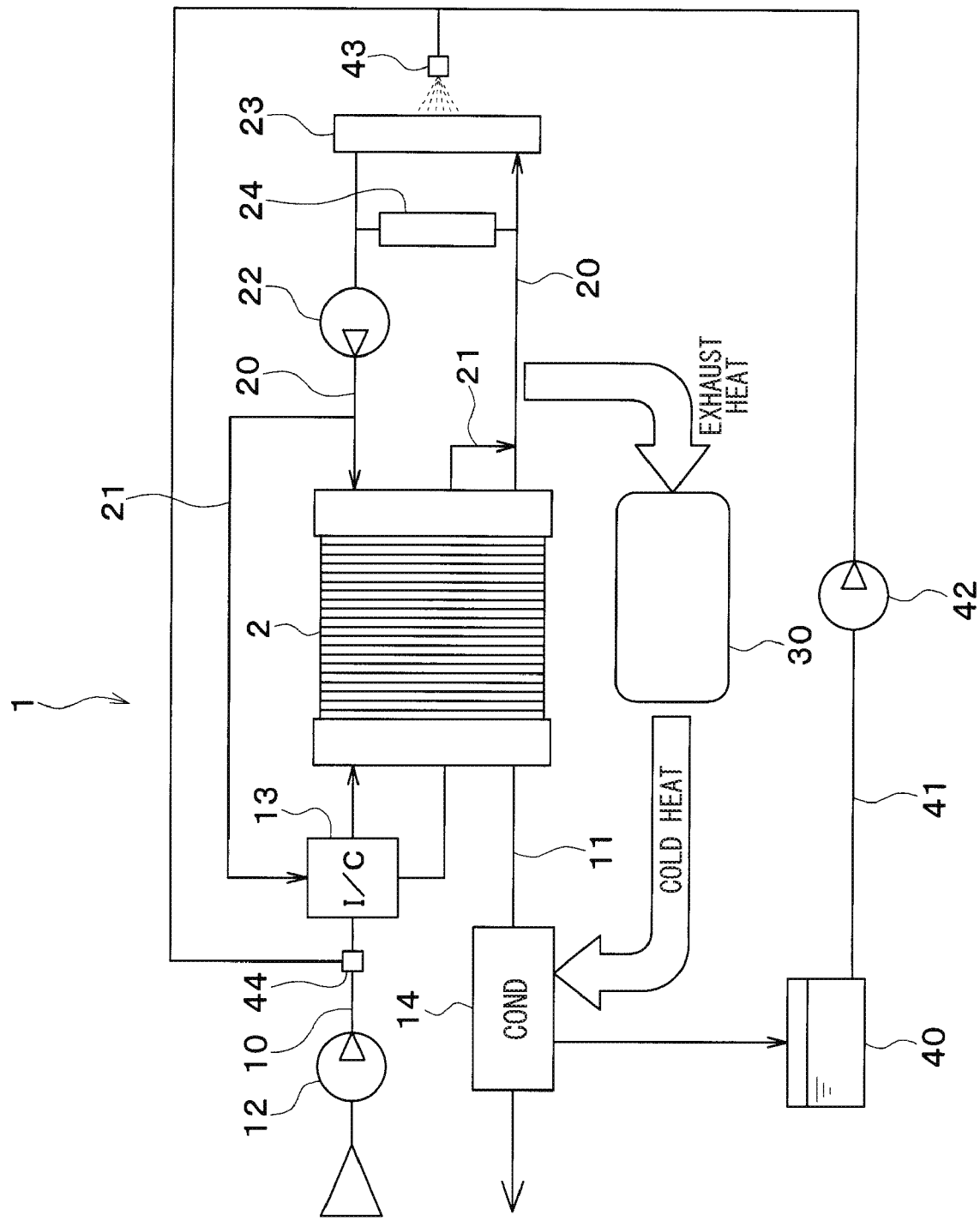
FIG. 1 is an overall diagram illustrating a fuel cell system according to at least one embodiment of the present disclosure.

Hereinafter, embodiments for implementing the present disclosure will be described referring to drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. In addition to the combinations of parts specifically shown in the respective embodiments, the embodiments can be partly combined even if not explicitly suggested, unless such combinations are contradictory.

First Embodiment

A first embodiment of the present disclosure will be described below with reference to FIGS. 1, 2. A fuel cell system 1 according to a first embodiment is applied to a so-called fuel cell vehicle, which is a kind of electric vehicle, and supplies electric power to an electric component such as an electric motor for vehicle travelling. The fuel cell system 1 may be an example of an energy conversion system.

As shown in FIG. 1, the fuel cell system 1 includes a fuel cell 2 that generates electricity through an electrochemical reaction between air (oxidant gas) and hydrogen (fuel gas). The fuel cell 2 has a stack structure in which multiple unit cells are stacked with each other. Each of the unit cells generates electricity by receiving supply of hydrogen and air containing oxygen. In the fuel cell 2, water is generated through electrochemical reaction.

An air supply passage 10 for supplying air to each unit cell and an air discharge passage 11 for discharging air containing unreacted oxygen that has not been used for the electrochemical reaction in the unit cells to the outside of the fuel cell 2 are connected to the fuel cell 2. The discharged air from the fuel cell 2 contains water vapor of the generated water. The fuel cell 2 is an energy converter which converts hydrogen that is an energy source into an electrical energy that is another form of energy and discharge heat and water vapor along with the energy conversion.

A compressor 12 that pressurizes the air and supplies the air to the fuel cell 2 is provided in the air supply passage 10. The compressor 12 may be an electric pump in which an electric motor drives an impeller housed in a casing that defines a pump chamber, for example. A water cooled intercooler 13 that cools the air to be supplied to the fuel cell 2 by cooling water is located in the air supply passage 10 and downstream of the compressor 12.

A condenser 14 that cools the discharged air from the fuel cell 2 is provided in the air discharge passage 11. The condenser 14 is a liquid water obtainer that condenses water vapor contained in the discharge air from the fuel cell 2 to obtain condensed water (that is, liquid water).

Although not shown in FIG. 1, a hydrogen supply passage for supplying hydrogen to each unit cell and a hydrogen discharge passage for discharging unreacted hydrogen together with generated water and nitrogen in the unit cells to the outside are connected to the fuel cell 2. A high-pressure hydrogen tank (not shown) is provided at the most upstream part of the hydrogen supply passage.

The fuel cell system 1 includes a cooling water passage 20 that circulates the cooling water to supply the cooling water to the fuel cell 2. A cooling water bypass passage 21 that supplies the cooling water to the intercooler 13 is branched from the cooling water passage 20. A pump 22 that circulates the cooling water is provided in the cooling water passage 20.

A radiator 23 that exchanges heat between the cooling water and open air to release heat of the fuel cell 2 to the open air is provided in the cooling water passage 20. A sub-radiator 24 is provided in the cooling water passage 20 in parallel with the radiator 23. The sub-radiator 24 is a radiator that exchanges heat between the cooling water and the open air. The sub-radiator 24 is used supplementarily when the radiator 23 alone is insufficient in cooling capacity, e.g. at a time of a high load of the fuel cell 2 when a cooling capacity of the radiator 23 is not insufficient. The radiator 23 may be an example of a fuel cell heat exchanger.

An adsorption refrigerator 30 that generates cold by adsorbing a working medium to and desorbing the working medium from an adsorbent is provided in the fuel cell system 1. The cold may be a medium at a low temperature. The adsorption refrigerator 30 is a cold generator that generates cold using the exhaust heat of the fuel cell 2. The cold generated by the adsorption refrigerator 30 is used for cooling the discharged gas from the fuel cell 2 by the condenser 14. The adsorption refrigerator 30 will be described later in detail.

In the condenser 14, the water vapor contained in the exhaust gas from the fuel cell 2 is condensed by the cold generated in the adsorption refrigerator 30. The condensed water generated in the condenser 14 is stored in a water storage 40.

A condensed water passage 41 is connected to the water storage 40. A condensed water pump 42 that pressurizes and sends the condensed water is disposed in the condensed water passage 41. The condensed water in the water storage 40 is supplied to a first condensed water supplier 43 and a second condensed water supplier 44. The first condensed water supplier 43 may be an example of an inside heat exchanger. The second condensed water supplier 44 may be an example of a supplied air water supplier.

The first condensed water supplier 43 is configured to supply the condensed water to a surface of the radiator 23. The radiator 23 can be cooled by supplying the condensed water to the surface of the radiator 23 by the first condensed water supplier 43. The second condensed water supplier 44 is configured to supply the condensed water to the air that flows through the air supply passage 10 and is to be supplied to the fuel cell 2. Since the second condensed water supplier 44 supplies the condensed water to the air to be supplied to the fuel cell 2, the supplied air can be humidified and the fuel cell 2 can be cooled.

Figure 2:
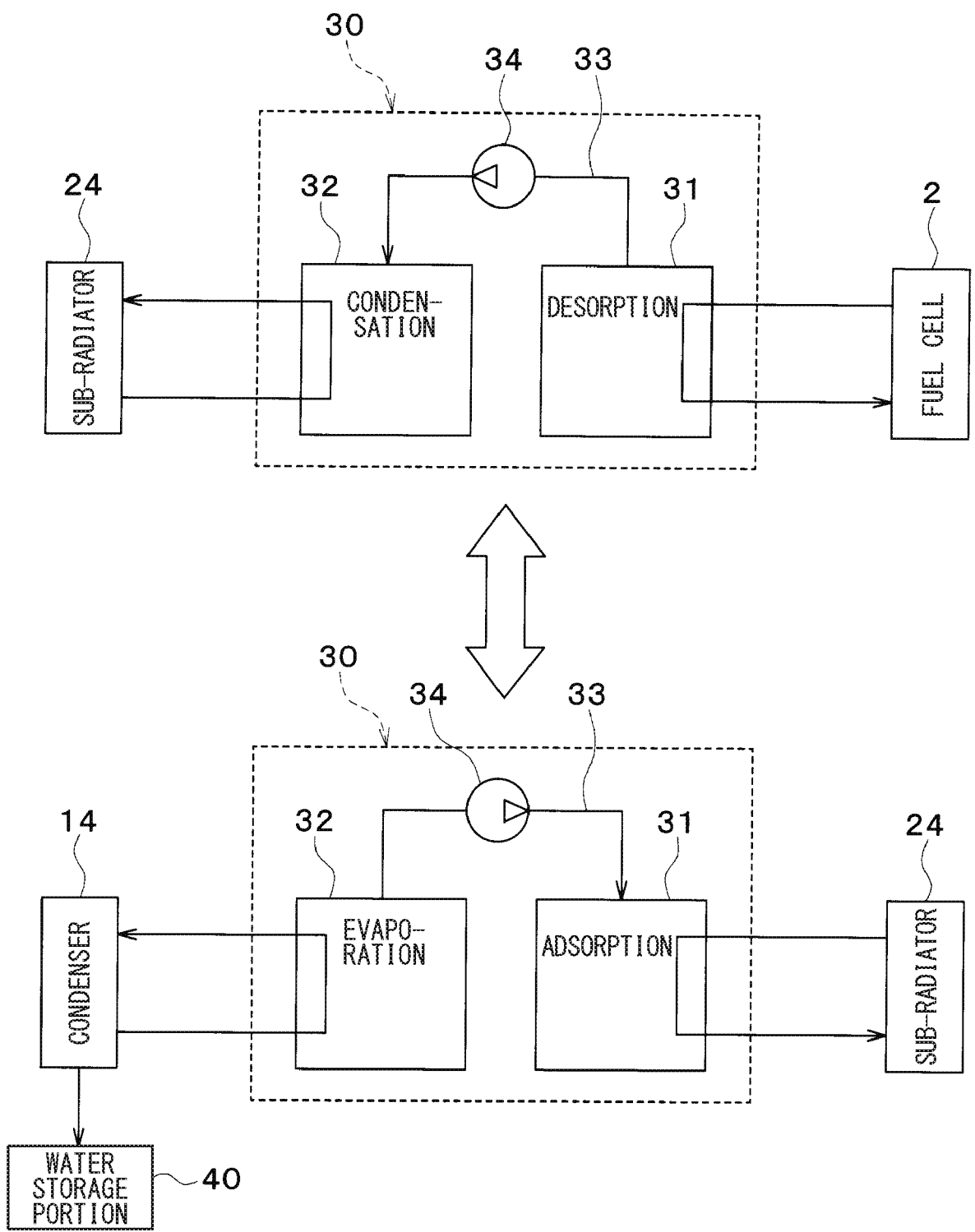
FIG. 2 is a conceptual diagram illustrating an adsorption refrigerator according to at least one embodiment of the present disclosure.

The adsorption refrigerator 30 is schematically shown in FIG. 2, a desorbing mode is shown on an upper side, and an adsorbing mode is shown on a lower side. As shown in FIG. 2, the adsorption refrigerator 30 includes an adsorbing portion 31, an evaporating-condensing portion 32, a medium passage 33, and a suction pump 34. In the adsorption refrigerator 30, two sets of these components 31-34 are provided, and the adsorbing mode and the desorbing mode are switched therebetween.

The adsorbing portion 31 is filled with the adsorbent capable of adsorbing the working medium. Zeolite-based adsorbent, silica-based adsorbent, activated carbon-based adsorbent, MOF-based adsorbent, metal halide, adsorbent polymer, or the like can be used as the adsorbent. Zeolite-based adsorbent is used in the present embodiment. The temperature at which the working medium is desorbed from the adsorbent depends on the combination of the adsorbent and the working medium.

It may be desirable that the adsorbent is mixed and sintered with metal micro fins to be a composite. The metal micro fins function as a heat conduction member that transfers the heat of the cooling water to the adsorbent. As the metal micro fin, a sintered metal may be used, for example. Sintered metal is a product made by heating metal powder or metallic fibers having a good thermal conductivity to combine through sintering without melting the material. Copper or copper alloy may be used as the metal powder or the metal fibers. The shape of the metal micro fin is not particularly limited, but a dendritic shape may be preferable to hold the adsorbent.

As the working medium adsorbed to and desorbed from the adsorbent, water, ammonia, alcohol, or a mixture thereof can be used. When a mixture is used as the working medium, the adsorption refrigerator 30 may work at a low temperature due to a freezing-point depression. Water is used as the working medium in the present embodiment.

The working medium moves between the adsorbing portion 31 and the evaporating-condensing portion 32 through the medium passage 33. The working medium is condensed and evaporated in the evaporating-condensing portion 32.

The suction pump 34 is disposed in the medium passage 33. A mechanical booster pump, an ejector pump, or the like may be used as the suction pump 34. The suction pump 34 of the present embodiment is capable of reversing the suction direction. The suction pump 34 is a decompressor that draws the working medium to decompress the adsorbing portion 31 or the evaporating-condensing portion 32. The suction pump 34 may compress the adsorbing portion 31 or the evaporating-condensing portion 32.

The adsorbing portion 31 and the evaporating-condensing portion 32 are configured to circulate the cooling water therethrough, and multiple cooling water circuits can be switched therebetween. In the adsorbing portion 31, (i) a cooling water circuit through which the cooling water flowing from the fuel cell 2 flows into the adsorbing portion 31 and (ii) a cooling water circuit through which the cooling water circulates between the sub-radiator 24 and the adsorbing portion 31 can be switched therebetween. In the evaporating-condensing portion 32, (i) a cooling water circuit through which the cooling water circulates between the sub-radiator 24 and the evaporating-condensing portion 32 and (ii) a cooling water circuit through which the cooling water circulates between the condenser 14 and the evaporating-condensing portion 32 can be switched therebetween.

In the cooling water circuit through which the cooling water flowing from the fuel cell 2 flows into the adsorbing portion 31, the cooling water flowing out of the fuel cell 2 flows into the adsorbing portion 31 before flowing into the radiator 23. When the cooling water circuit is formed between the sub-radiator 24 and the adsorbing portion 31 or the evaporating-condensing portion 32, the sub-radiator is fluidically separated from the fuel cell 2 and the radiator 23 and connected to the adsorbing portion 31 or the evaporating-condensing portion 32.

Next, operations of the adsorption refrigerator 30 will be described.

In the desorbing mode shown on the upper side of FIG. 2, the cooling water circuit through which the cooling water flowing from the fuel cell 2 flows into the adsorbing portion 31 is formed. Accordingly, the adsorbing portion 31 is heated by the exhaust heat of the fuel cell 2, and the working medium desorbs from the adsorbent.

In the desorbing mode, the working medium is drawn by the suction pump 34 from the adsorbing portion 31 to the evaporating-condensing portion 32, and the adsorbing portion 31 is decompressed. Accordingly, the desorption temperature of the working medium is lowered, and the working medium is surely desorbed even when the exhaust heat of the fuel cell 2 is insufficient for desorption of the working medium.

The working medium in a gas form desorbed from the adsorbent in the adsorbing portion 31 moves to the evaporating-condensing portion 32 through the medium passage 33. In the evaporating-condensing portion 32, the cooling water circuit through which the cooling water circulates between the sub-radiator 24 and the evaporating-condensing portion 32 is formed. Accordingly, the working medium in a gas form that moved to the evaporating-condensing portion 32 is cooled and condensed by the cooling water.

In the adsorbing mode shown on the lower side of FIG. 2, the cooling water circuit through which the cooling water circulates between the evaporating-condensing portion 32 and the condenser 14 is formed. Accordingly, the heat of the exhaust gas from the fuel cell 2 is transferred to the evaporating-condensing portion 32 through the cooling water, and the working medium in a liquid form is evaporated.

In the adsorbing mode, the working medium is drawn by the suction pump 34 from the evaporating-condensing portion 32 to the adsorbing portion 31, and the evaporating-condensing portion 32 is decompressed. Accordingly, evaporation of the working medium is enhanced.

In the evaporating-condensing portion 32, cold is generated by a latent heat generated when the working medium evaporates. The cold generated in the evaporating-condensing portion 32 is transferred to the condenser 14 through the cooling water, and the exhaust gas from the fuel cell 2 is cooled. In the condenser 14, the water vapor contained in the exhaust gas from the fuel cell 2 is condensed, and the condensed water is stored in the water storage 40.

The condensed water stored in the water storage 40 is sprayed onto the surface of the radiator 23 by the first condensed water supplier 43, or supplied to the air to be supplied to the fuel cell 2 by the second condensed water supplier 44 as required.

The working medium in a gas form evaporated in the evaporating-condensing portion 32 moves to the adsorbing portion 31 through the medium passage 33 and is adsorbed to the adsorbent. In the adsorbing portion 31, the cooling water circuit through which the cooling water circulates between the sub-radiator 24 and the adsorbing portion 31 is formed. Accordingly, the heat generated when the working medium is adsorbed to the adsorbent can be released to an open air in the sub-radiator 24 through the cooling water. Therefore, a temperature increase of the adsorbent can be suppressed, and adsorption of the working medium to the adsorbent can be enhanced.

According to the present embodiment described above, the cold is generated in the adsorption refrigerator 30 using the exhaust heat of the fuel cell 2. And then, the exhaust gas from the fuel cell 2 is cooled by the cold generated in the adsorption refrigerator 30 to condense the water vapor in the exhaust gas, and accordingly the liquid water is obtained. Accordingly, the exhaust gas from the fuel cell 2 can be cooled efficiently, and efficiency in obtaining the condensed water can be improved compared with a case where the exhaust gas from the fuel cell 2 is cooled by an open air. As a result, a shortage of water stored in the water storage 40 can be avoided as much as possible, and it may be possible to limit a user from having to refill water.

According to the present embodiment, the cold is generated in the adsorption refrigerator 30 using the exhaust heat of the fuel cell 2. Accordingly, a running cost for generating cold can be suppressed compared with a case where the cold is generated by a refrigeration cycle or the like. Since a fuel cost of the fuel cell system 1 as in the present embodiment is comparatively high, and accordingly suppressing the running cost for generating cold is particularly effective.

In the present embodiment, the adsorbing portion 31 is decompressed by the suction pump 34 in the desorbing mode. Accordingly, the working medium is surely desorbed even when the exhaust heat of the fuel cell 2 is insufficient to desorb the working medium from the adsorbent.

Second Embodiment

Next, a second embodiment of the present disclosure will be described. Description of the same parts as those in the first embodiment is omitted, and only different parts will be described.

Figure 3:
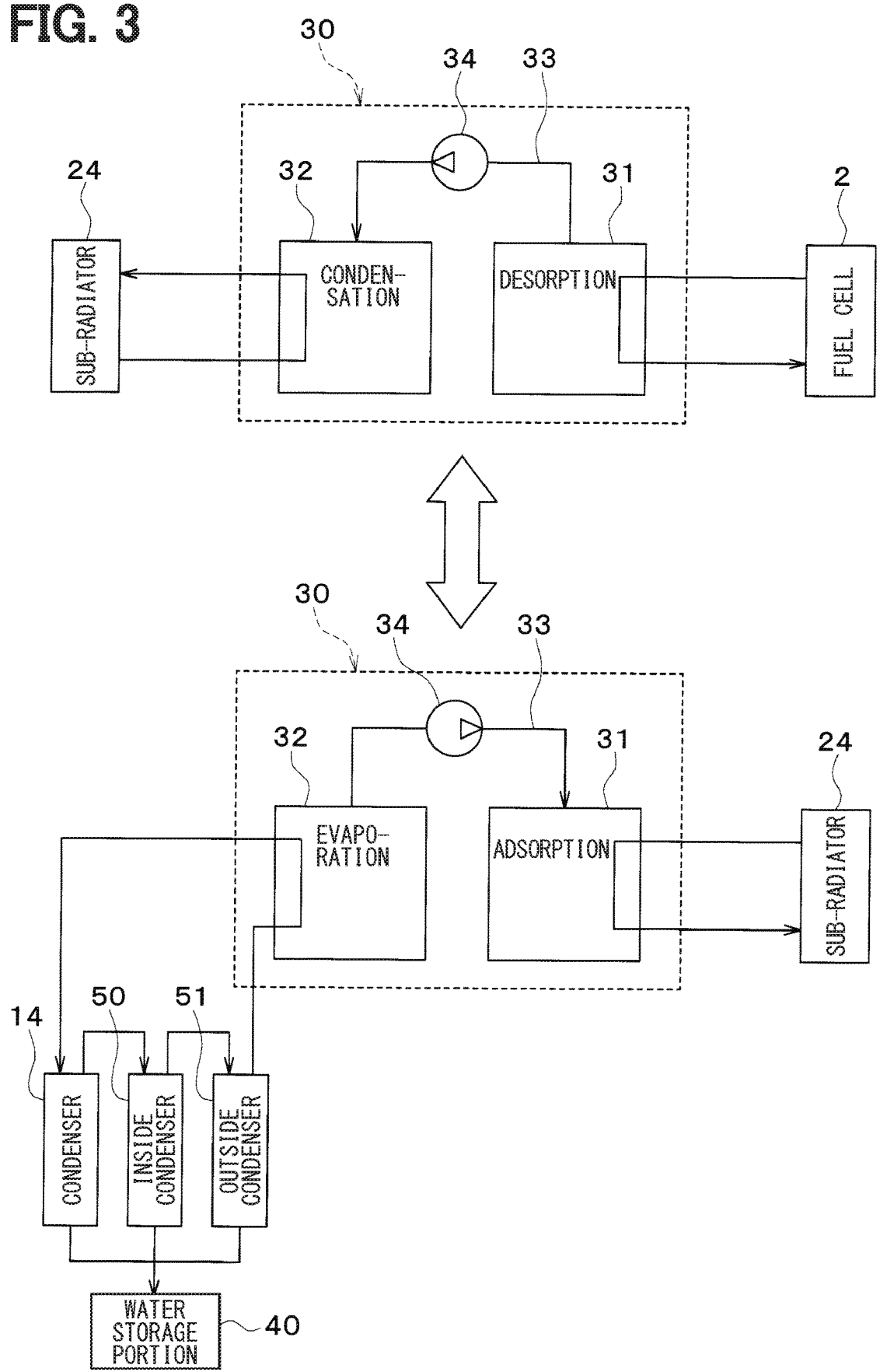
FIG. 3 is a conceptual diagram illustrating an adsorption refrigerator according to at least one embodiment of the present disclosure.

As shown in FIG. 3, in a fuel cell system 1 of the second embodiment, an inside condenser 50 that exchanges heat between a cooling water and an air in a passenger compartment (i.e. inside air), and an outside condenser 51 that exchanges heat between the cooling water and air outside the passenger compartment (i.e. outside air) are provided. The inside condenser 50 may be an example of an inside heat exchanger. The outside condenser 51 may be an example of an outside heat exchanger.

The inside condenser 50 is configured to obtain condensed water (i.e. liquid water) from the inside air by condensing water vapor contained in the inside air using cold generated in the adsorption refrigerator 30. The outside condenser 51 is configured to obtain condensed water (i.e. liquid water) from the outside air by condensing water vapor contained in the outside air.

In the adsorbing mode, a cooling water circuit in which the cooling water circulates through the evaporating-condensing portion 32, condenser 14, inside condenser 50, and the outside condenser 51 is formed. In the adsorbing mode, the inside air is cooled at the inside condenser 50 and the outside air is cooled at the outside condenser 51 by the cold generated in the adsorption refrigerator 30. Accordingly, the water vapor contained in the inside air is condensed at the inside condenser 50 to be the condensed water, and the water vapor contained in the outside air is condensed at the outside condenser 51 to be the condensed water. The condensed water (i.e. liquid water) generated at the inside condenser 50 and the outside condenser 51 are stored in the water storage 40.

According to the second embodiment described above, cold is generated in the adsorption refrigerator 30 using the exhaust heat of the fuel cell 2, and the condensed water is obtained by cooling the inside air and the outside air using the cold to condense the water vapor in the inside air and the outside air. Accordingly, water is obtained from the inside air and the outside air in addition to the exhaust gas from the fuel cell 2, and the volume of the condensed water increases.

The present disclosure is not limited to the above embodiments but can be modified in various manners as follows without departing from the spirit of the present disclosure. Further, means disclosed in the above embodiments may be appropriately combined within an enabling range.

In the above-described embodiments, the fuel cell 2 is used as an example of the energy converter. However, a different energy converter such as an internal combustion engine may be used as long as it discharges heat and water vapor along with energy conversion.

In the above-described embodiments, the suction pump 34 that decompresses adsorbing portion 31 in the desorbing mode is provided. However, since the desorption temperature of the working medium varies depending on the combination of the adsorbent and the working medium, the suction pump 34 may be omitted when the exhaust heat of the fuel cell 2 is sufficient to desorb the working medium from the adsorbent.

In the above-described embodiments, the liquid water obtained from the exhaust gas from the fuel cell 2 by the cold generated using the exhaust heat of the fuel cell 2 is supplied to the radiator 23 and the air to be supplied to the fuel cell 2. However, the liquid water obtained from the exhaust gas from the fuel cell 2 may be used for different purposes.

In the above-described second embodiment, the cooling water flowing out of the evaporating-condensing portion 32 flows through, in order, the condenser 14, the inside condenser 50, and the outside condenser 51 in the adsorbing mode. However, the cooling water may circulate in a different order. Further, the cooling water flowing out of the evaporating-condensing portion 32 may flow through only one of the inside condenser 50 and the outside condenser 51.

In the above-described embodiments, the adsorption refrigerator 30 is used as an example of the cold generator that generates cold using the exhaust heat of the fuel cell 2. However, different types of cold generators may be used. For example as the cold generator, an absorption refrigerator that has an absorbent absorbing the working medium and a thermoacoustic refrigerator that generates cold through energy conversion between thermal energy and sound energy using thermoacoustics may be used.

Although the present disclosure has been described in accordance with the embodiments, it is understood that the present disclosure is not limited to the embodiments and structures disclosed therein. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An energy conversion system comprising:
   an energy converter that is configured to convert energy of a source from one form to another form and generate heat and water vapor;
   a cold generator that is configured to generate cold using the heat generated by the energy converter; and
   a liquid water obtainer that is configured to condense the water vapor using the cold to obtain liquid water, wherein
   the cold generator is an adsorption refrigerator that:
      has an adsorbent selectively adsorbing and desorbing a working medium; and
      generates the cold by a latent heat of vaporization of the working medium.

2. The energy conversion system according to claim 1, wherein
   the energy converter is a fuel cell that generates a generated water through an electrochemical reaction between oxygen contained in an air and hydrogen that are supplied to the fuel cell, and
   the water vapor is the generated water contained in the air discharged from the fuel cell.

3. The energy conversion system according to claim 2, further comprising:
   a fuel cell heat exchanger that is configured to release the heat from the fuel cell to an open air; and
   a heat exchanger water supplier that is configured to supply the liquid water obtained by the liquid water obtainer to the fuel cell heat exchanger to cool the fuel cell heat exchanger.

4. The energy conversion system according to claim 2, further comprising:
   a supplied air water supplier that is configured to supply the liquid water obtained by the liquid water obtainer to the air to be supplied to the fuel cell.

5. The energy conversion system according to claim 1, further comprising:
   at least one of an inside heat exchanger that is configured to cool an inside air by the cold and an outside heat exchanger that is configured to cool an outside air by the cold, wherein
   the inside heat exchanger is configured to condense water vapor contained in the inside air by the cold to obtain liquid water,
   the outside heat exchanger is configured to condense water vapor contained in the outside air by the cold to obtain liquid water,
   the inside air is air inside a passenger compartment, and
   the outside air is air outside the passenger compartment.

6. The energy conversion system according to claim 1, wherein
   the adsorption refrigerator includes:
      an adsorbing portion in which the adsorbent selectively adsorbs and desorbs the working medium;
      a condensing portion that is configured to condense the working medium desorbed from the adsorbent; and
      a decompressor that is disposed between the adsorbing portion and the condensing portion and is configured to decompress an inside of the adsorbing portion when the adsorbent desorbs the working medium.

* * * * *